United States Patent [19]

Sherblom

[11] Patent Number: 4,825,551
[45] Date of Patent: May 2, 1989

[54] STRAINER LADLE

[76] Inventor: Paul A. Sherblom, 15 Iowa St., Worcester, Mass. 01602

[21] Appl. No.: 146,227

[22] Filed: Jan. 20, 1988

[51] Int. Cl.$^4$ .................. A47J 43/28; A47J 43/00; A47J 19/00

[52] U.S. Cl. .................................. 30/326; 30/325; 30/147

[58] Field of Search ............... 30/324, 325, 137, 149, 30/150, 326, 147; 210/464, 469, 470; 99/316; D7/47

[56] References Cited

U.S. PATENT DOCUMENTS

| Re. 7,925 | 10/1877 | Ulmer | 30/147 |
| 19,419 | 2/1858 | Haines | 30/325 |
| 1,367,568 | 2/1921 | Smith | 30/326 |
| 1,601,613 | 9/1926 | Fenyves | 30/325 |
| 2,455,623 | 12/1948 | Stone | 30/326 |
| 4,043,039 | 8/1977 | Goetz, Jr. | 30/325 |

FOREIGN PATENT DOCUMENTS

| 1190486 | 10/1959 | France | 30/326 |
| 353806 | 10/1937 | Italy | 30/325 |
| 8461 | 4/1893 | United Kingdom | 30/326 |

Primary Examiner—Frank T. Yost
Assistant Examiner—Paul M. Heyrana, Sr.
Attorney, Agent, or Firm—Blodgett & Blodgett

[57] ABSTRACT

A strainer ladle which comprises an outer ladle having an unperforated bowl and a handle, an inner ladle having a perforated bowl which is nested within the unperforated bowl and a handle which is slidably mounted on the handle of the outer ladle. The perforated bowl can be moved between a closed position in which two bowls are nested to an open position in which the two bowls are spaced from each other.

7 Claims, 1 Drawing Sheet

U.S. Patent — May 2, 1989 — 4,825,551
FIG. 1
FIG. 2
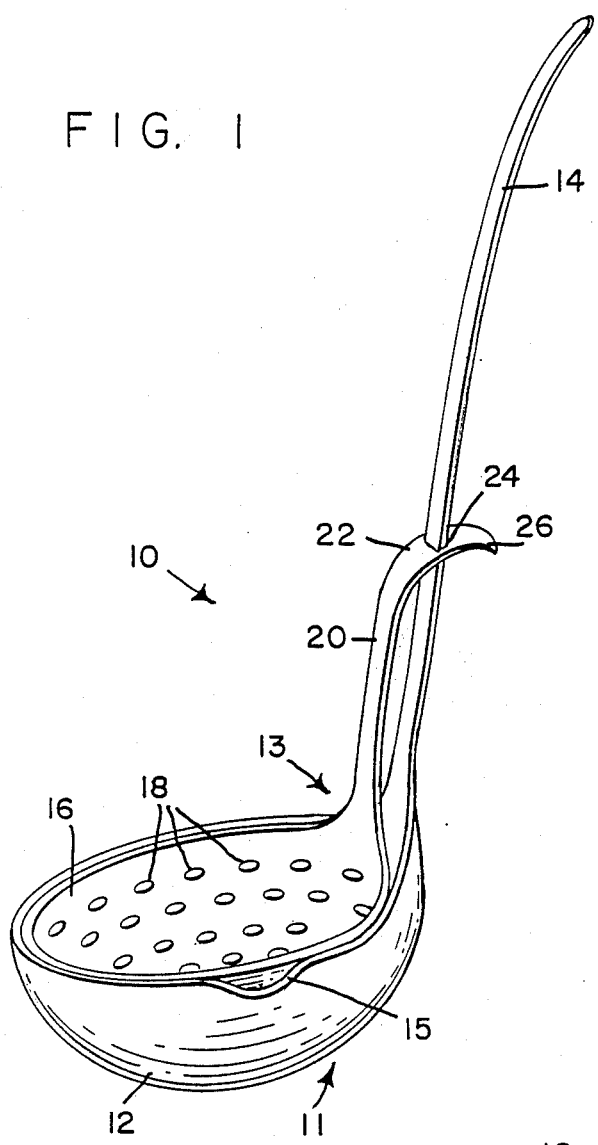
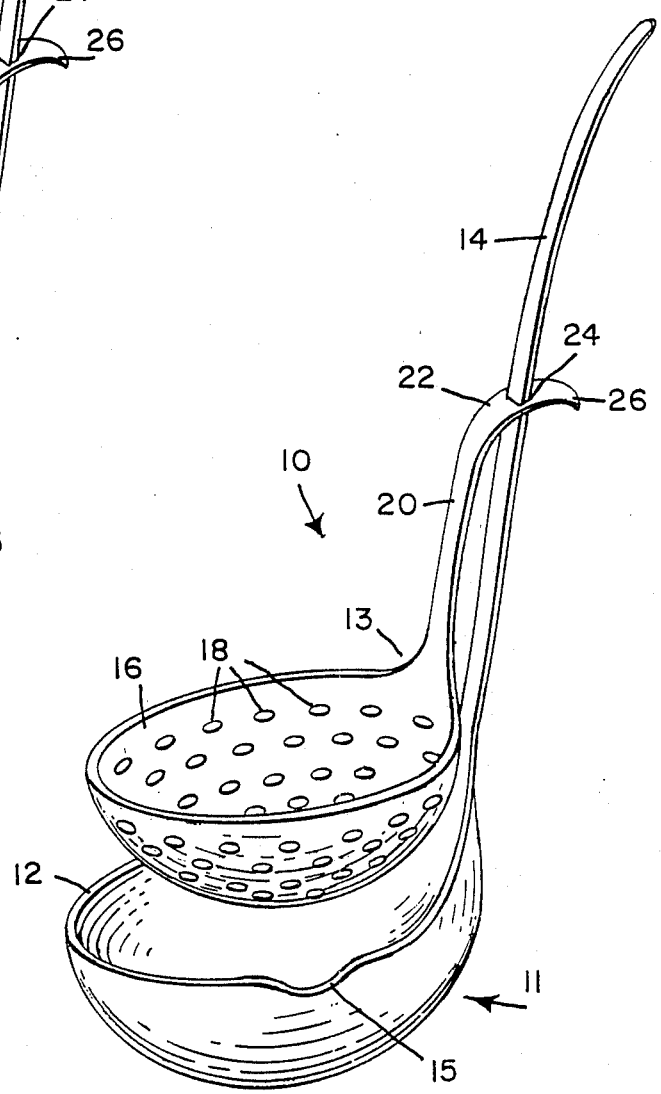

STRAINER LADLE

BACKGROUND OF THE INVENTION

The present invention relates to a kitchen ladle for soups, stews, gravy, beverages or other liquid, solids mixtures.

The traditional kitchen ladle is a deep-bowled, long handled spoon for serving liquid, solid mixtures such as soup, stews, gravy or fruit punch. The ladle insures that the liquid and solids portion of the soup, stew or other mixture are served together. However, the ladle is incapable of serving the liquid only or the solids only from the liquid solids mixture. Solids can be removed from a liquid, solids mixture by using a perforated spoon or strainer. The strainer is incapable, however, of serving the liquid only from the liquid, solids mixture. For example, it may be necessary to serve broth only from soup for infants or for convalescing adults. In order to obtain the broth, all of the solids must be removed from the mixture or the mixture must be poured through a strainer into another container. With respect to fruit punches, most people would prefer not to have solids in their drink. Pouring the punch from the bowl is awkward and impractical. In certain types of fermented beverages which contain solids, the appearance of the solids in the drink is highly objectionable. In spite of this, the solids must remain in the mixture until the drink is served for obtaining maximum flavor. These and other difficulties experienced with the prior art devices have been obviated by the present invention.

It is, therefore, a principle object of the invention to provide a combination ladle strainer which enables solids and liquid to be separated from a liquid, solids mixture.

Another object of the invention is the provision of a combination ladle, strainer which is capable of functioning as a ladle or a strainer.

A further object of the present invention is the provision of a combination ladle, strainer in which the strainer and ladle portions of the combination are separable and each portion is independently functionable as a ladle and a strainer, respectfully.

It is another object of the present invention to provide a combination ladle, strainer which is simple in construction and easy to use with one hand.

With these and other objects in view, as will be apparent to those skilled in the art, the invention resides in the combination of parts set forth in the specification and covered by the claims appended hereto.

SUMMARY OF THE INVENTION

The invention comprises a standard kitchen ladle which has a deep bowl and elongated handle, and a ladle shaped strainer which has a perforated deep bowl which nests within the bowl of the ladle and an elongated handle which is slidably mounted on the handle of the ladle so that the bowl of the strainer can be moved from the nested position within the bowl of the ladle to a separated position in which the bowl of the strainer is spaced from the bowl of the ladle.

BRIEF DESCRIPTION OF THE DRAWINGS

The character of the invention, however, may be best understood by reference to one of its structural forms, as illustrated by the accompanying drawings, in which:

FIG. 1 is a perspective view of a strainer ladle device embodying the principles of the present invention, showing the strainer portion of the device in a closed or nested position with respect to the ladle portion of the device, and FIG. 2 is a view similar to FIG. 1, showing the strainer portion of the device in an open or separated position with respect to the ladle portion of the device.

DETAILED DESCRIPTION OF THE INVENTION

Referring to the drawings, the strainer ladle of the present invention is generally indicated by the reference numeral 10. The strainer ladle 10 comprises an outer ladle, generally indicated by the reference numeral 11 and an inner strainer ladle, generally indicated by the reference numeral 13 which is removably mounted on the outer ladle 11.

The outer ladle 11 has an unperforated bowl 12 and a first elongated handle 14 which is integral with the bowl 12 and extends upwardly from the bowl. The bowl 12 has a pouring spout 15. The inner strainer ladle 13 comprises a bowl 16 and a second elongated handle 20 which is integral with the bowl 16 and extends upwardly from the bowl 16. The bowl 16 has a plurality of perforations 18 and nests within the bowl 12 as illustrated in FIG. 1. The upper end of the second handle 20 includes a flange 22 which has an opening 24. The first handle 14 extends freely through the opening 24 so that the handle 20 can be moved freely along the handle 14. This enables the bowl 16 to be moved between a closed position in which the perforated bowl 16 is nested within the unperforated bowl 12 as illustrated in FIG. 1 to an open position in which the bowl 16 is substantially spaced from the bowl 12 as illustrated in FIG. 2. The flange 22 extends beyond the handle 14 so as to form a finger tab 26. This enables the user to hold the strainer ladle 10 and move the inner ladle 13 relative to the outer ladle 11 with one hand. The user's other hand is thereby free for other tasks such as holding a receptacle. The size of the handle 14 is smaller in cross section than the opening 24 from at least the lowest position of the flange 22 relative to the handle 14 to the uppermost point of the handle 14. This enables the inner ladle 13 to be completely removed from the outer ladle 11.

The operation and advantages of the present invention will now be readily understood in view of the above description. The bowls 12 and 16 which are shown in the nested position in FIG. 1 are inserted deeply into a liquid, solid mixture within a container so that the inner bowl 16 is filled with the mixture. The ladle strainer 10 is then lifted from the container and the inner bowl 16 is raised to the open position relative to the outer bowl 12 as shown in FIG. 2. This allows the liquid to drain into the outer bowl 12, thereby leaving the solids in the inner bowl 16. The liquid can then be poured into a separate receptacle. The solids can be discarded or returned to the liquid, solids mixture, depending on the nature of the mixture. The perforated ladle 13 and the unperforated ladle 11 can each be used separately if desired by removing the ladle 13 from the ladle 11. Also, other similar perforated ladles can be used with the unperforated ladle 11. These additional perforated ladles can differ in the size and number of perforations for different applications.

The handle 14 and the opening 24 have the same non-circular cross sectional shape so that when the bowl 16 is in the open position as shown in FIG. 2, the inner ladle 13 is prevented from rotating about the longitudinal axis of the handle 14.

The bowl 16 fits snugly within the bowl 12 so that when the bowls are nested as shown in FIG. 1, solids cannot enter between the bowls when the bowls are in a liquid, solids mixture.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent is:

1. A strainer ladle for separating particulate material and liquid from a mixture of liquid and particulate material comprising:
   (a) an outer unperforated bowl which is capable of holding liquid,
   (b) a first elongated handle which is fixed to said outer unperforated bowl,
   (c) an inner perforated bowl which fits inside of said unperforated bowl and which is capable of holding particulate material and which allows liquid to drain out of the perforated bowl, and
   (d) a second elongated handle which is fixed to said perforated bowl and which is slidably mounted on said first elongated handle so that said inner perforated bowl is movable between a closed position in which the perforated bowl lies within said outer unperforated bowl to an open position in which the said inner perforated bowl is substantially spaced from said outer unperforated bowl, whereby the particulate material from a mixture of particulate material and liquid in said stainer ladle remains in the inner perforated bowl and the liquid from said mixture drains from the perforated bowl into said outer unperforated bowl.

2. A stainer ladle as recited in claim 1, wherein said second elongated handle has a flange which extends at a substantial angle to the remainder of the second elongated handle, said flange having an opening through which the first elongated handle extends freely for enabling said flange to slide on said first elongated handle so that said inner perforated bowl can be moved between said first and second positions.

3. A strainer ladle as recited in claim 2, wherein said flange extends substantially beyond said first elongated handle to form a finger tab for moving the flange along said first elongated handle.

4. A strainer ladle as recited in claim 2, wherein said first elongated handle has a free end and the portion of said first elongated handle which extends between said flange and said free end is smaller in cross section than said opening to enable said flange to slide beyond said free end for removal of said second elongated handle and perforated bowl from said first elongated handle.

5. A strainer ladle as recited in claim 2, wherein the cross section of said first elongated handle and the cross section of said opening are of the same non-circular shape so that said flange is prevented from rotating about the longitudinal axis of said first handle when said inner bowl is spaced from said outer bowl.

6. A strainer ladle as recited in claim 1, wherein said outer unperforated bowl has an upper peripheral edge and a pouring spout at said upper edge.

7. A strainer ladle as recited in claim 1, wherein said inner perforated bowl fits snugly within said outer unperforated bowl to prevent solids from entering between said bowls when said inner bowl is in said closed position within a liquid, solids mixture.

* * * * *